United States Patent
King et al.

(10) Patent No.: US 7,928,598 B2
(45) Date of Patent: Apr. 19, 2011

(54) APPARATUS, METHOD, AND SYSTEM FOR CONVEYING ELECTRICAL ENERGY

(75) Inventors: Robert Dean King, Schenectady, NY (US); Zhi Zhou, Selkirk, NY (US)

(73) Assignee: General Electric Company, Schenectady, NY (US)

( * ) Notice: Subject to any disclaimer, the term of this patent is extended or adjusted under 35 U.S.C. 154(b) by 222 days.

(21) Appl. No.: 12/417,983

(22) Filed: Apr. 3, 2009

(65) Prior Publication Data

US 2010/0253145 A1    Oct. 7, 2010

(51) Int. Cl.
*B60L 1/00* (2006.01)
(52) U.S. Cl. .......................................... 307/9.1
(58) Field of Classification Search ............... 307/9.1
See application file for complete search history.

(56) References Cited

U.S. PATENT DOCUMENTS

| | | | |
|---|---|---|---|
| 3,909,685 A * | 9/1975 | Baker et al. ................. 318/139 |
| 5,373,195 A | 12/1994 | De Doncker et al. |
| 5,710,699 A | 1/1998 | King et al. |
| 5,903,449 A | 5/1999 | Garrigan et al. |
| 7,049,792 B2 | 5/2006 | King |
| 2005/0122071 A1 | 6/2005 | King et al. |

* cited by examiner

*Primary Examiner* — Robert L. DeBeradinis
(74) *Attorney, Agent, or Firm* — Ziolkowski Patent Solutions Group, SC; Jean K. Testa

(57) ABSTRACT

An apparatus, system, and method, the apparatus includes an intelligent energy transfer system including a configurable switching system electrically coupleable to a vehicle. The vehicle includes one of an electric vehicle and a plug-in hybrid electric vehicle. The configurable switching system is configured to convey a first direct current (DC) energy from a first energy source to an energy storage system of the vehicle, receive a first alternating current (AC) energy conveyed to the vehicle, convey a second DC energy from the vehicle to a first DC powered load, and convey a second AC energy from the vehicle to a first AC powered load. Each of the first energy source, the first AC powered load, and the first DC powered load are located remotely from the vehicle.

26 Claims, 7 Drawing Sheets

APPARATUS, METHOD, AND SYSTEM FOR CONVEYING ELECTRICAL ENERGY

BACKGROUND

Embodiments of the invention relate generally to a system for conveying electrical energy and, more particularly, to a system for conveying electrical energy to and from a vehicle.

Electric vehicles (EVs) and plug-in hybrid electric vehicles (PHEVs) are typically powered by an energy storage system including one or more batteries, either alone or in combination with an internal combustion engine. In electric vehicles, the one or more batteries powers all vehicle electrical systems including the entire drive system, thereby eliminating the need for an internal combustion engine. Plug-in hybrid electric vehicles, on the other hand, include battery power to supplement power supplied by an internal combustion engine, which greatly increases the fuel efficiency of the internal combustion engine and of the vehicle.

Generally, electrical energy is provided to EVs via an electrical grid for charging the on-board electrical storage devices. That is, many EVs are designed to "plug" in to an electrical grid such that an energy storage system of the EV can be charged therefrom. Often, a converting apparatus is used to transform alternating current (AC) that is provided from the electrical grid into direct current (DC) that is stored in the EV. PHEVs have also been designed or modified to receive charging energy from public utilities in a similar manner.

Public utilities, however, are just one of a variety of energy sources that provide electrical energy. For example, alternate electrical energy sources such as solar or photovoltaic arrays and wind turbines may also be used. Unlike public utilities, however, many of these alternate electrical energy sources are not designed to produce electrical energy in the form of alternating current. That is, many electrical energy sources produce electrical energy in the form of direct current.

Unfortunately, many of the apparatuses designed to aid in the transference of electric energy from public utilities to an EV or PHEV, such as the converting apparatus discussed above, are specifically designed to receive charging power from public utilities that produce AC energy. Often, another apparatus is needed to aid in the transference of energy from a DC energy source to an EV or PHEV.

Generally, the electrical energy that is stored in an EV or PHEV is used to power the vehicle itself (i.e., the EV or PHEV). As discussed above, there are apparatuses available that aid in the conveyance of electrical energy from an outside source to an EV or PHEV. There is, however, not a widely accepted means for supplying electrical energy stored in an EV or PHEV to a load not associated with the EV or PHEV. In other words, there is not a widely accepted means for converting a EV or PHEV into an energy source for loads outside the vehicle.

As such, it may be desirable to have a system that has aspects and features that differ from those that are currently available and that solves at least the aforementioned problems. Further, it may be desirable to have a method that differs from those methods that are currently available.

BRIEF DESCRIPTION OF THE INVENTION

Aspects of the invention provide an intelligent energy transfer system including a configurable switching system electrically coupleable to a vehicle. The vehicle includes one of an electric vehicle and a plug-in hybrid electric vehicle. The configurable switching system is configured to convey a first direct current (DC) energy from a first energy source to an energy storage system of the vehicle, receive a first alternating current (AC) energy conveyed to the vehicle, convey a second DC energy from the vehicle to a first DC powered load, and convey a second AC energy from the vehicle to a first AC powered load. Each of the first energy source, the first AC powered load, and the first DC powered load are located remotely from the vehicle.

Aspects of the invention also provide a configurable energy conveyance system including an energy storage system mechanically coupled to a vehicle, a configurable switching system electrically coupleable to the vehicle, and a processing system configured to control the configurable switching system and coupled to the configurable switching system. The vehicle is one of an electric vehicle and a plug-in electric hybrid vehicle. The processing system is programmed to initiate a first transfer of electrical energy from the energy storage system through the configurable switching system to a first load outside the vehicle, initiate a second transfer of electrical energy from the energy storage system through the configurable switching system to a second load outside the vehicle, initiate a transformation of alternating current (AC) electrical energy from an AC source outside the vehicle into direct current (DC) energy, and initiate a third transfer of electrical energy from a DC source outside the vehicle to the energy storage system. The first load includes an AC load and the second load includes a DC load.

Aspects of the invention also provide a method of manufacturing an energy transfer system that includes configuring a switching system for a vehicle to provide a first direct current (DC) energy from a first energy source to an energy storage system of the vehicle, programming a conversion device to transform an alternating current (AC) energy passed to the vehicle from a second energy source into a second DC energy based on a voltage of the AC energy, configuring the switching system to provide a DC supply energy to a DC load located remotely from the vehicle, and configuring the switching system to provide an AC supply energy to an AC load located remotely from the vehicle. The vehicle includes one of a plug-in electric vehicle and a plug-in hybrid electric vehicle. The first energy source is located remotely from the vehicle and the second energy source is located remotely from the vehicle.

Various other features may be apparent from the following detailed description and the drawings.

BRIEF DESCRIPTION OF THE DRAWINGS

The drawings illustrate at least one preferred embodiment presently contemplated for carrying out the invention.

In the drawings.

DETAILED DESCRIPTION

The invention includes embodiments that relate to conveying electrical energy to and from a vehicle such as an electric vehicle (EV) or plug-in hybrid electric vehicle (PHEV). According to embodiments of the invention, an intelligent energy transfer system may convey incoming direct current (DC) energy to outgoing DC energy, transform incoming DC energy into outgoing alternating current (AC) energy, convey incoming AC energy to outgoing AC energy, and transform incoming AC energy into outgoing DC energy. The intelligent energy transfer system may be contained within a vehicle such as an EV or PHEV, or the energy transfer system may include a device that stands alone from the vehicle.

Figure 1:
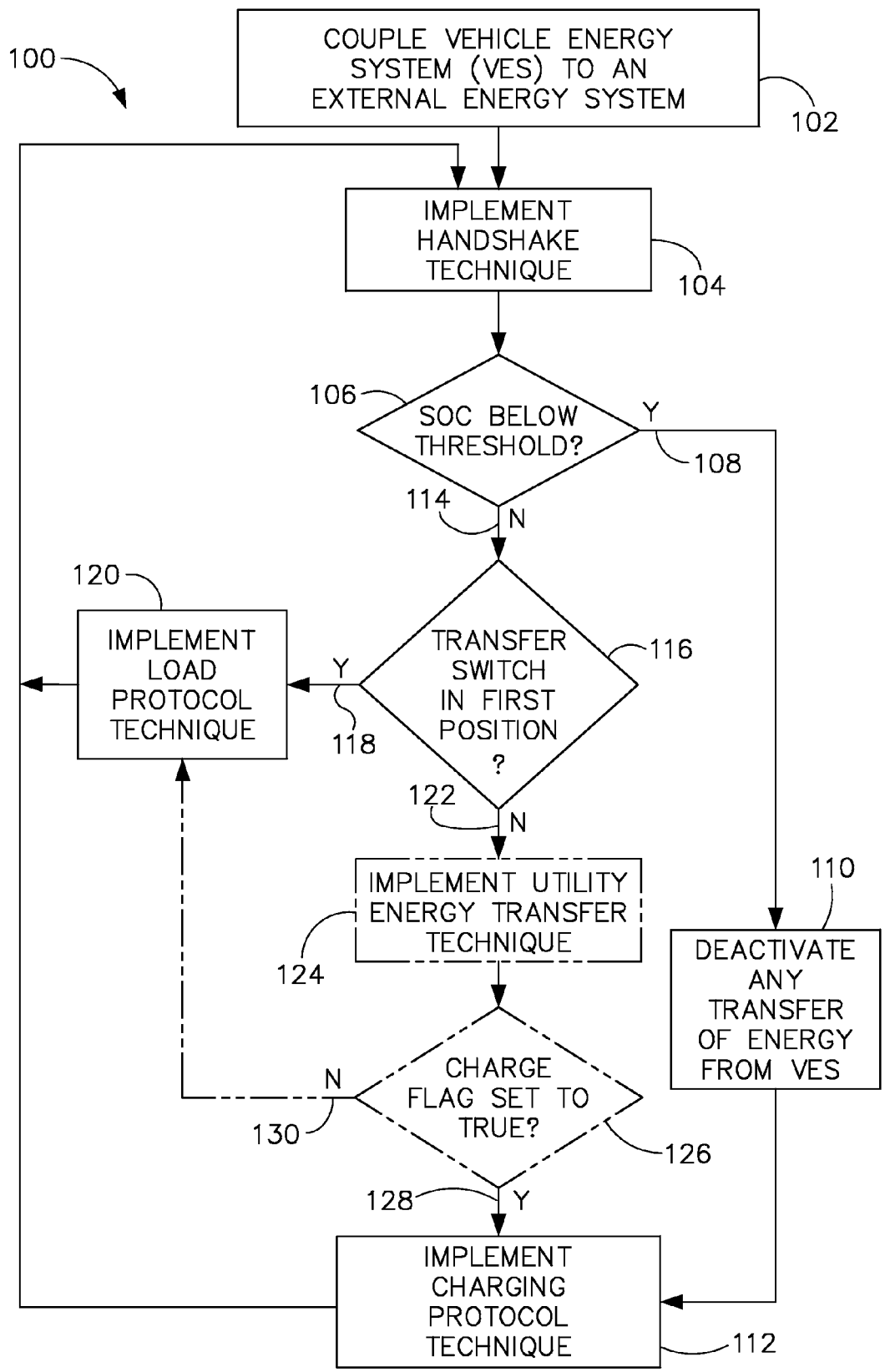
FIG. 1 is a flowchart depicting an electrical energy transfer technique for conveying electrical energy to and from a vehicle according to an embodiment of the invention.

Referring to FIG. 1, a flowchart depicting an electrical energy transfer technique 100 for conveying electrical energy to and from an EV or a PHEV is shown according to an embodiment of the invention. As will be described in greater detail below, technique 100 enables electrical energy conveyance to and from a vehicle energy system of an EV or of a PHEV. Generally, an energy system external or outside to the vehicle energy system acts as an energy source (ES) if the external or outside energy system supplies electrical energy to the vehicle energy system. On the other hand, an external energy system acts as an energy load (EL) if the external energy system receives electrical energy (i.e., acts as an electrical load) from the vehicle energy system. An energy system external to the vehicle energy system may switch between acting as an EL and as an ES. For example, a public or private electrical grid (e.g., a utility grid) may act as an ES when it supplies energy to the vehicle system, and the same utility may act as an EL when it receives energy (i.e., draws a load) from the vehicle energy system.

Technique 100 begins at block 102, where a vehicle energy system (VES) of a vehicle (e.g., an EV or a PHEV) is coupled to an external energy system such as an energy source (ES) and/or energy load (EL) such that energy transfer to and/or from the vehicle may take place. The VES may include one or more batteries or ultra-capacitors or flywheels that store energy for the EV or PHEV.

An ES may, for example, be a public or private electric utility grid accessible from a home, a business, or a public charging station. In addition, an ES may, for example, be an energy source other than an electric utility grid such as a wind turbine, a solar array, a fuel cell, or a generator. It is contemplated that an ES may be any energy source that generates or supplies AC or DC energy to the VES.

An EL, on the other hand, consumes or stores electrical energy. It is contemplated that an EL may include any resistive load that consumes AC or DC energy or any reactive load that stores AC or DC energy from the VES. For example, the EL may include a motor or other electrically driven or powered system that consumes AC or DC energy. As discussed above, an EL may also include a public or private utility grid receiving electrical energy from the VES rather than supplying energy to the VES.

After the VES is coupled to an outside energy system, process control proceeds to block 104, where a handshake technique is implemented. The handshake ensures that any potential energy conveyance will be within thresholds of the VES and will not come into contact with an operator of the vehicle. The handshake also determines the state-of-charge (SOC) of the VES. The SOC indicates a quantity or level of electrical energy stored in the VES of the vehicle. Further details regarding handshake technique will be set forth below with respect to FIG. 2.

Following the handshake technique of FIG. 1, process control proceeds to decision block 106, where it is determined if the SOC is below a threshold (i.e., an SOC threshold). In one embodiment, the SOC threshold is predetermined and is based on operating parameters of the VES. For example, the predetermined SOC threshold may be based on a predetermined optimal charge range where the VES can effectively supply energy to an outside load while also maintaining enough energy to either operate a vehicle drive system if needed or prevent significant degradation in the energy storage life of the VES. If it is determined that the SOC is below the SOC threshold 108, any transfer of energy from the VES to an EL is deactivated at block 110. Accordingly, the VES is protected from over-depletion of charge stored therein. Process control then proceeds to block 112, where a charging protocol technique is implemented. As will be described in greater detail below with respect to FIG. 3, the charging protocol technique determines if the VES will receive charge from an ES. Following the implementation of the charging protocol technique, process control proceeds back to block 104 of FIG. 1, where the handshake technique is again implemented and technique 100 continues.

If, on the other hand, it is determined at decision block 106 that the SOC is not below the SOC threshold 114, process control proceeds to decision block 116, where it is determined whether a transfer switch is in a first position. The transfer switch is a switch that may be located on or within the vehicle, or it may be located remotely from the vehicle (e.g., in a home or business). It is contemplated that the transfer switch is controllable by a user via, for example, a switch, a computer, and/or a controller. In one embodiment, it is contemplated that the transfer switch has at least a first position and a second position. If the transfer switch is in the first position, the VES is allowed to supply energy to an EL if certain criteria are met. If the transfer switch is in the second position, however, the VES may receive charge from an ES if certain criteria are met. It is also contemplated, as will be described in greater detail below, that if the switch is in the second position, the VES may be allowed to supply energy to an electrical grid.

Accordingly, if it is determined that the transfer switch is in the first position 118, process control proceeds to block 120, where a load protocol technique is implemented. As will be described in greater detail below with respect to FIG. 4, the load protocol technique determines if the VES will supply energy to an EL. After implementing the load protocol technique, process control proceeds back to block 104, where the handshake technique is again implemented as technique 100 continues.

It may, however, be determined at decision block 106 that the transfer switch is not in the first position 122. For example, it may be determined that the transfer switch is in a second position. In such an instance, it is contemplated that process control proceeds to block 112 in one embodiment, where the charging protocol technique is implemented as described in greater detail below with respect to FIG. 3. After implementing the protocol technique, process control proceeds back to block 104, where the handshake technique is again implemented and technique 100 continues.

In another embodiment of the invention, it is contemplated that if it is determined that the transfer switch is not in the first position 122, process control proceeds to block 124 (shown in phantom), where a utility transfer technique is implemented. The utility transfer technique may either cause the VES to supply energy to an electrical grid for a fee (i.e., a credit) or it may cause the VES to receive energy (i.e., receive a charge) for a fee (i.e., a debit). Further details regarding the utility transfer technique will be set forth below with respect to FIG. 5. Generally speaking, the utility transfer technique causes the VES to either supply or receive energy by either setting a charge flag to false or true. After the utility transfer technique is implemented, process control proceeds to decision block 126 (shown in phantom) of FIG. 1, where it is determined whether the utility transfer technique set a charge flag to true. If it is determined that the utility transfer technique set a charge flag to true 128, process control proceeds to block 112, and the charging protocol technique is implemented. On the other hand, if it is determined that the utility transfer technique set a charge flag to false 130, process control proceeds to block 120 and the load protocol is implemented.

Technique 100 has been described above in the context of an ES supplying energy to the VES or an EL receiving energy from the VES. It is contemplated that that both an ES and a EL may be simultaneously coupled to the VES. In such an instance, technique 100 may be implemented for the ES and the EL serially or in parallel. In a similar manner, it is contemplated that technique 100 may be implemented for multiple ESs and/or multiple ELs.

Figure 2:
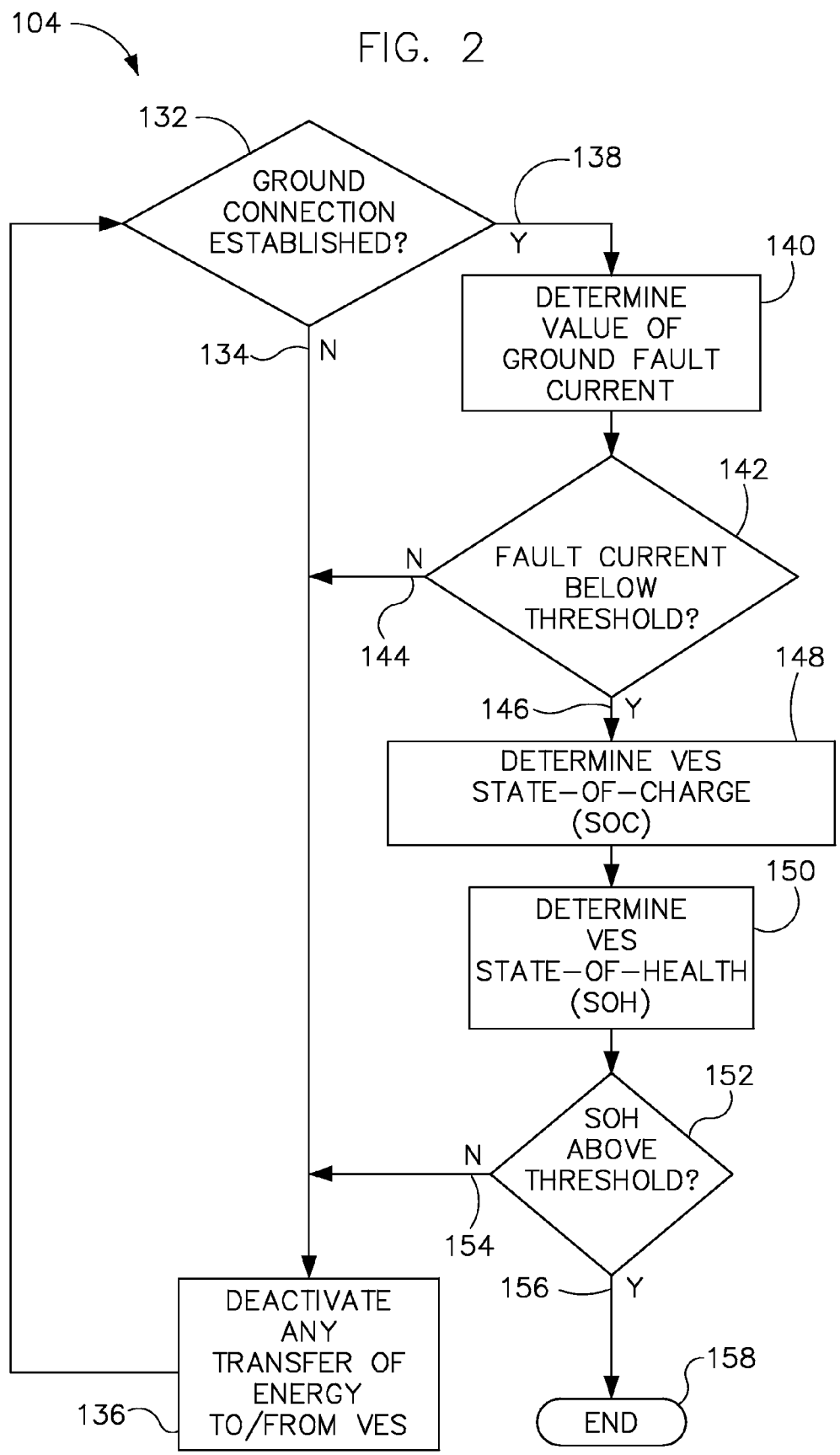
FIG. 2 is a flowchart depicting a handshake technique according to an embodiment of the invention.

Referring now to FIG. 2, a flowchart depicting handshake technique 104 of FIG. 1 is shown according to an embodiment of the invention. Beginning at decision block 132 of FIG. 2, it is determined whether a ground connection between the VES and the potential outside energy system is established. If it is determined that a ground connection is not established 134, process control proceeds to block 136, where any transfer of energy to or from the VES is deactivated or not allowed to be activated. Accordingly, the user and the VES are protected from contact to excessive voltage. Process control then proceeds back to decision block 132, where it is once again determined whether a ground connection between the VES and the potential outside energy system is established.

If, on the other hand, it is determined that a ground connection is established 138, process control proceeds to block 140, where a value, if any, of a ground fault current is determined. After determining any ground fault current value, process control proceeds to decision block 142, where it is determined if the ground fault current value is below a predetermined threshold. If it is determined at decision block 142 that the ground fault current value is not below the predetermined threshold 144, process control proceeds to block 136, where any transfer of energy to or from the VES is deactivated or prevented from being activated. Process control then proceeds back to decision block 132, where it is once again determined whether a ground connection is established.

Alternatively, if it is determined that the ground fault current value is below the predetermined threshold (e.g., the ground fault current is zero or within an acceptable threshold near zero) 146, process control proceeds to block 148, where the SOC is determined. Process control then proceeds to block 150, where a state-of-health (SOH) of the VES is determined. The SOH of the VES refers to the ability of the VES to meet its rated performance during discharge (e.g., supplying a load) or during charge. The SOH may be determined from a variety of parameters. For example, where the VES includes one or more batteries, the SOH may be based on a battery terminal voltage as a function of current, an estimate of internal battery resistance, a battery temperature, a battery voltage at a given value of the SOC determined at block 148, and/or trends of battery resistance over the life or calendar age of a battery, or any combination thereof.

After determination of the SOH, process control proceeds to decision block 152, where it is determined whether the SOH of the VES is above a predetermined threshold. The SOH threshold may be a minimum value of the SOH where energy transfer to and from the VES is allowed. If it is determined that the SOH is not above the predetermined threshold 154, process control proceeds to block 136, where any transfer of energy to or from the VES is deactivated or prevented from being activated. Process control then proceeds back to decision block 132, where it is once again determined whether a ground connection is established.

If, on the other hand, it is determined that the SOH is above the predetermined threshold 156, technique 104 proceeds to an end at 158. Accordingly, with regard to FIG. 1, technique 100 would then proceed to decision block 106, where it is determined whether the SOC is above the SOC threshold.

Referring back to FIG. 2, in one embodiment, process control only proceeds to decision block 106 if the ground fault connection is established 138, the fault current is below a threshold 146, and the SOH is below a threshold 156. Accordingly, technique 104 protects the VES while also protecting a person in contact with the VES or vehicle. It is contemplated that the order in which decisions 132, 142, and 152 are determined may be rearranged as long as the value of the ground fault current is determined before a determination is made as to whether the fault current is below the threshold and as long as the SOH is determined before a determination is made as to whether the SOH is above the threshold.

Figure 3:
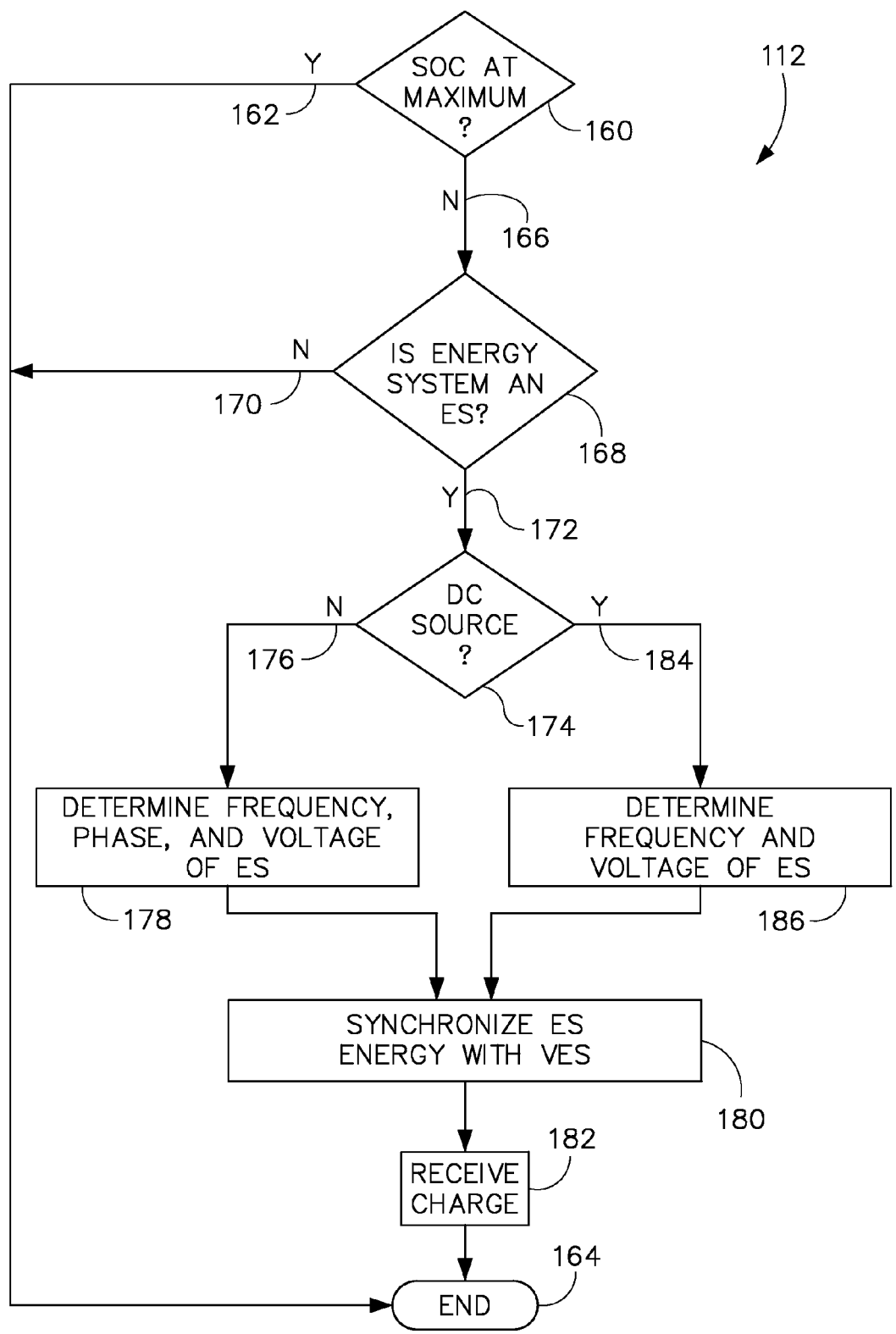
FIG. 3 is a flowchart depicting a load protocol technique according to an embodiment of the invention.

Referring to FIG. 3, a flowchart depicting charging protocol technique 112 of FIG. 1 is shown according to an embodiment of the invention. Technique 112 begins at decision block 160, where it is determined whether the SOC, determined during handshake technique 104 of FIGS. 1 and 2, is at a maximum. In other words, it is determined if the VES is fully or substantially fully charged. If it is determined that the SOC is at a maximum 162, process control proceeds to an end at 164, and the VES is not charged. As such, technique 100 of FIG. 1 continues back to the handshake technique at block 104.

Once again referring back to FIG. 3, if it is determined that the SOC is not at the maximum 166, process control proceeds to decision block 168, where it is determined if the external energy system is an ES. In one embodiment, such a determination is based on a waveform measured from the external energy system (i.e., the ES or EL). From the measured waveform, it is determined whether the external energy system is a load (i.e., an EL) or a supply (i.e., ES).

If it is determined that the external energy system is not an ES 170 (i.e., the external energy system is an EL), process control proceeds to end at 164. Accordingly, the VES will not be charged, and technique 100 of FIG. 1 continues as process control proceeds to block 104, where the handshake technique is implemented.

Alternatively, if it is determined that the external energy system is an ES 172, process control proceeds to decision block 174, where it is determined whether the ES is a supplier of DC energy or AC energy. It is contemplated that a measured waveform, such as the waveform measured to determine if the external energy system is an ES, is analyzed to determine if the ES is a supplier of DC or AC energy. If it is determined that the ES is not a supplier of DC energy 176 (i.e., the ES is a supplier of AC energy), process control proceeds to block 178, where the frequency, phase, and voltage of the ES is determined using one or more detectors. Process control then proceeds to block 180, where the ES is synchronized with an energy transfer system coupled to the VES based on the determined frequency, phase, and voltage of the ES. Synchronization between the ES and VES reduces reductions in the life cycle of the VES in addition to reducing stress on electrical components thereof. The synchronization also allows for seamless transfer of energy from the ES to the VES.

The energy transfer system, in part, synchronizes incoming energy coming from an ES and also synchronizes outgoing energy from the VES to the EL(s). Further details regarding the energy transfer system will be set forth in greater detail with respect to FIGS. 6 and 7.

After synchronization, process control proceeds to block 182, where a charge is then received by the VES from the ES via the energy transfer system. As will be discussed in greater detail below with respect to FIGS. 6 and 7, it is contemplated that a bi-directional converter coupled to the energy transfer system and coupled to the VES synchronizes the incoming energy such that upon conveyance of the electrical energy to the energy storage systems of the VES (e.g., one or more batteries, ultra-capacitors, or flywheel systems of the VES), the electrical energy is in a form acceptable by the VES and the storage components thereof. For example, the bi-directional convertor (i.e., a conversion device) may convert incoming AC energy to DC energy prior to storage in the VES of the vehicle. After a charge is received by the VES or supplied by the ES, process control proceeds to end at 164. Process control then proceeds to block 104 of FIG. 1, where the handshake technique is again implemented.

Alternatively, if it is determined during the course of technique 112 of FIG. 3 that the potential ES is a DC source 184, process control proceeds to block 186, and a frequency, such as ripple frequency, and voltage of the ES are determined using one or more detectors. It is noted that in a pure DC signal, the frequency would be zero. However, in a DC signal that is produced by rectification from an AC signal, there is a corresponding ripple frequency. For example, if the DC signal is rectified from a single phase AC 60 Hz signal, the ripple frequency will be different than the ripple frequency of a DC signal that is produced by rectification from a 3-phase signal. The ES energy, which is DC energy, is then synchronized with the VES at block 180. As in the context of AC sources, the synchronization between the DC source and the VES reduces reductions in the life cycle of the VES and also reduces stress on electrical components thereof and allows for a seamless transfer of energy. After synchronization, process control proceeds to block 182, and a charge is received by the VES from the ES via the energy transfer system. In addition, it is again contemplated that a bi-directional converter of the energy transfer system and coupled to the VES synchronizes the incoming DC energy such that, upon conveyance of the electrical energy to the energy storage systems of the VES (e.g., one or more batteries, ultra-capacitors, or flywheels of the VES), the electrical energy is in a form acceptable by the VES and the storage components thereof. Process control then proceeds to end at 164. Accordingly, technique 100 of FIG. 1 continues as process control proceeds back to block 104, and the handshake technique is again implemented.

Figure 4:
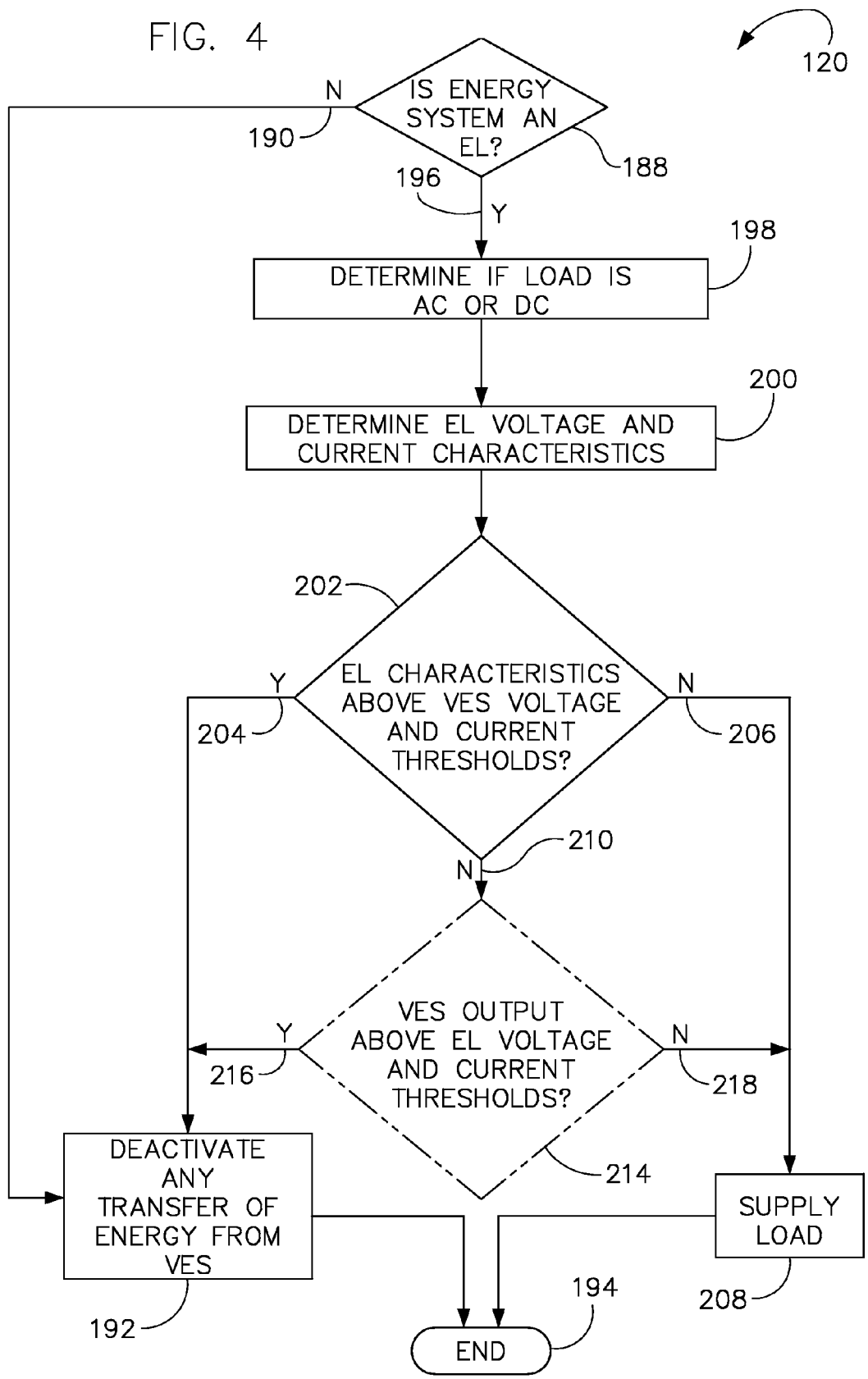
FIG. 4 is a flowchart depicting a charging protocol technique according to an embodiment of the invention.

Referring to FIG. 4, a flowchart depicting load protocol technique 120 of FIG. 1 is shown according to an embodiment of the invention. Load protocol technique 120 of FIG. 4 begins at decision block 188, where it is verified that the external energy system coupled to the VES is a load (i.e., an EL). It is contemplated that a waveform of the external energy system is measured and analyzed to determine if the system is an EL or an ES. If it is determined that the external energy system is not an EL (i.e., the external energy system is an ES) 190, process control proceeds to block 192, and any transfer of energy from the VES is deactivated. Accordingly, the VES is protected from surge of energy from an ES. Process control then proceeds to an end at 194, and technique 100 of FIG. 1 continues as the handshake technique is again implemented at block 104.

On the other hand, if it is determined at decision block 188 of FIG. 4 that the external energy system is an EL 196, process control proceeds to block 198, where it is determined if the EL is an AC load or a DC load. Next, at block 200, the voltage and current characteristics of the EL are determined. Such a determination may be based on standards unique to particular loads, where the standards or load specifications are stored in a computer readable storage medium coupled to a processing system of the VES. The determination may also be based on a stored history of loads previously drawn by the EL(s). In yet another embodiment, the determination of the EL voltage and current characteristics may be based on EL measurements such as voltage and/or current waveform measurements of the respective EL. Due to the relationship between voltage, current, and power, it is contemplated that in yet another embodiment a power characteristic and only one the voltage or current characteristics of the respective EL are determined.

After determining the EL characteristics, process control proceeds to decision block 202, where it is determined if the EL characteristics determined at block 200 are above predetermined VES voltage and current thresholds. In another embodiment, if the determined EL characteristics of block 200 include a power characteristic and one of a voltage or current characteristics, these characteristics would be compared to a VES power threshold and one of a VES voltage threshold or current threshold to determine if the respective characteristics are above the respective VES thresholds.

In one embodiment, the VES voltage, current, and/or power thresholds are set to respective maximum limits where the circuitry of the VES can safely supply energy to an EL without causing any reductions in a life cycle of the VES or exceed ratings of the VES or components associated therewith.

If it is determined that the EL characteristics will be above the VES thresholds 204, process control proceeds to block 192, where any transfer of energy from the VES is deactivated. Accordingly, the VES is protected from over-limit conditions that could be produced by the EL. If the EL has not been drawing energy from the VES, it will not be allowed to start drawing energy. On the other hand, if the EL was already drawing energy from the VES, this energy transfer will be deactivated. After deactivating any transfer of energy, process control proceeds to end at 194, thus allowing technique 100 of FIG. 1 to continue as the handshake technique is once again implemented at block 104.

Referring back to FIG. 4, alternatively, it may be determined that the EL characteristics are not above the VES thresholds 206. In such an instance, process control proceeds to block 208, where a load to the EL is supplied It is contemplated that, in an alternate embodiment, if it is determined that the EL characteristics are not above the VES thresholds 210, process control proceeds to decision block 214 (shown in phantom), where it is determined if the VES output will be above EL voltage and current thresholds. In an alternate embodiment, it is determined at decision block 214 if the VES output will be above an EL power threshold and one of an EL voltage or current threshold. The EL thresholds are respectively based on the EL voltage and current characteristics and/or power thresholds. Often, the thresholds will be of a greater magnitude than the characteristics. For example, a particular load, such as an air conditioning compressor, may require a "starting" current that is five times greater than the its normal "run" current. As such, the EL current threshold would be five times greater than the EL current characteristic. In one embodiment, a lookup table is accessed to determine the thresholds (e.g., voltage, current, or power thresholds) of the EL. It is contemplated that the lookup table includes continuous and transient current, voltage, and/or power requirements or thresholds of various ELs and may be stored on a computer readable storage medium that is coupled to the VES.

If the VES output will be above any of the respective EL thresholds 216, process control proceeds to block 192, and any transfer of energy to the EL is deactivated. That is, if any energy is being transferred to the ES, the transfer will be deactivated. If there is not any transfer of energy, the VES will not be allowed to initiate a transfer of energy to the EL. Accordingly, the circuitry of the EL is also protected by technique 120. Process control then proceeds to end at 194, and technique 100 of FIG. 1 continues as process control proceeds back to block 104, where the handshake technique is again implemented.

In the alternative, it may be determined that the VES output will not be above the EL thresholds 218. In such an instance, process control proceeds to block 208, where a load is supplied to the EL. Process control then proceeds to end at 194, and technique 100 of FIG. 1 continues as process control proceeds to block 104 and the handshake technique is again implemented.

Figure 5:
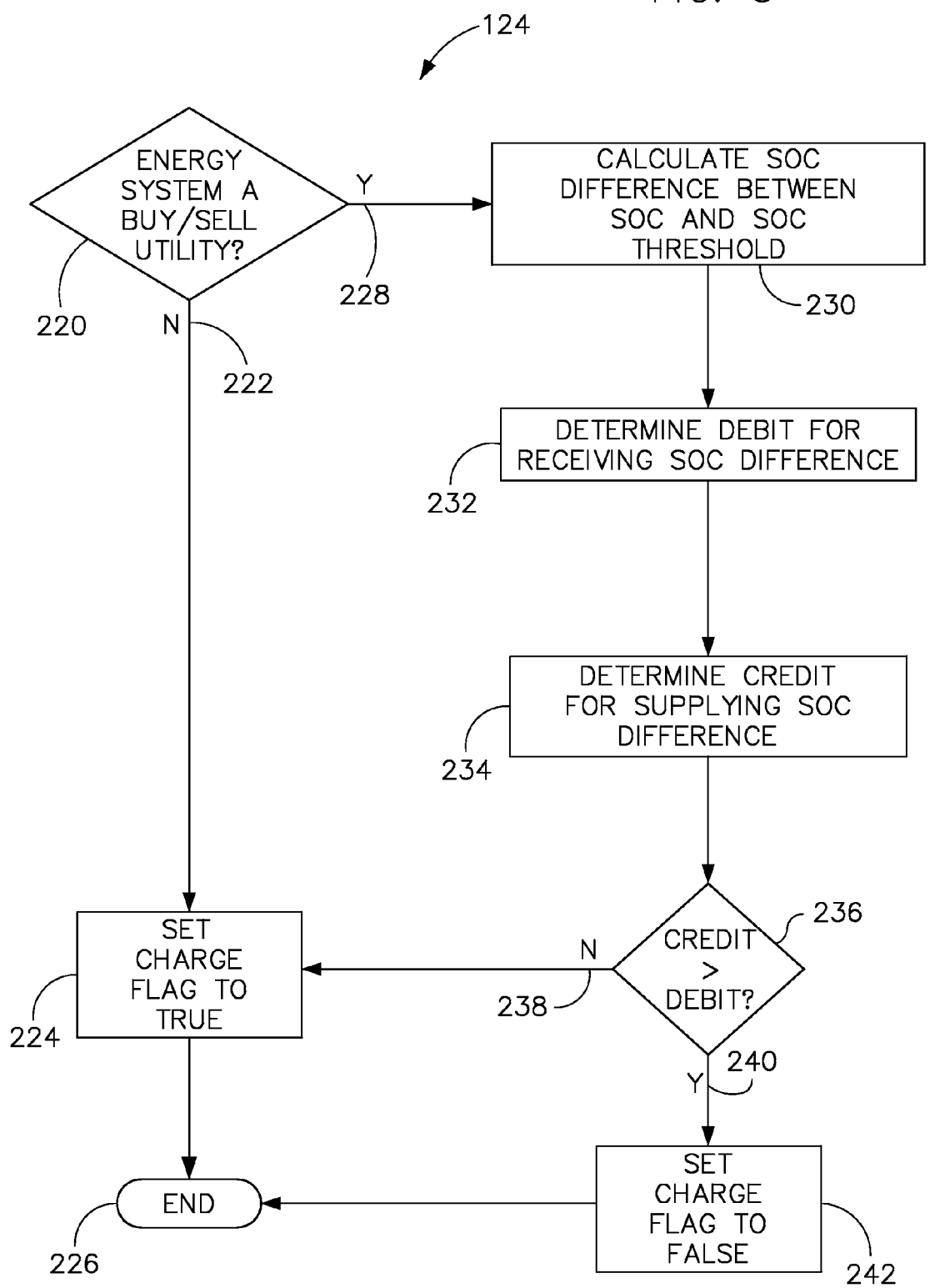
FIG. 5 is a schematic block diagram of an intelligent energy transfer system coupleable to a vehicle according to an embodiment of the invention.

As discussed above with respect to FIG. 1, it is contemplate that a utility transfer technique may be implemented at block 124 (shown in phantom in FIG. 1) after it is determined that the transfer switch is in a second position 122. A flowchart depicting an embodiment of utility energy transfer technique 124 is shown in FIG. 5. According to an embodiment of the invention, technique 124 begins at decision block 220, where it is determined if the external energy system is a buy/sell utility. In other words, it is determined if the external energy system is capable of receiving energy (i.e., the external energy system serves as an EL) for a fee and is capable of providing energy (i.e., the external energy system serves as an ES) for a fee. If it is determined that the external energy system is not a buy/sell utility 222, process control proceeds to block 224, where a charge "flag" is set to true. Process control then proceeds to an end at 226, and technique 100 of FIG. 1 continues to decision block 126, where it is determined that the charge flag is set to true 128. Therefore, according to the present embodiment, the charging protocol technique is implemented at block 112. Accordingly, as shown in FIGS. 1 and 5, if the transfer switch is not in the first position 122 and the external energy system is not a buy/sell utility 222, the charging protocol technique is implemented at block 112. Alternatively, if the load transfer switch is in the first position 118, the load protocol technique is implemented at block 120.

Referring back to FIG. 5, if it is determined that the external energy system is a buy/sell utility 228, process control proceeds to block 230, where the SOC difference between the determined SOC and the SOC threshold is calculated. In other words, the quantity of the SOC above the SOC threshold is determined. Process control then proceeds to block 232, where the debit or debit value of the SOC difference is determined. That is, a price the buy/sell utility will charge for supplying a quantity of energy equivalent, or substantially equivalent, to the SOC difference is determined or estimated. Process control then proceeds to block 234, where a credit for supplying the SOC difference is determined. That is, the price the buy/sell utility will pay for the SOC difference is determined or estimated.

Process control then proceeds to decision block 236, where it is determined if the credit is greater than the debit. If the credit is not greater than the debit 238, process control proceeds to block 224, where the charge flag is set to true. Process control then proceeds to end at end 226, and technique 100 of FIG. 1 continues as process control proceeds to decision block 126 thereof, where is determined if the charge flag was set to true. Since, in this instance, the charge flag was set to true, process control of FIG. 1 proceeds to block 112, where the charging protocol is implemented.

Referring back to FIG. 5, if it is determined that the credit is greater than the debit 240, process control proceeds to block 242, where the charge flag is set to false. Process control then proceeds to end 226, and process control of technique 100 of FIG. 1 proceeds to decision block 126, where it is determined if the charge flag was set to true. Since, in this instance, the charge flag was sent to false 130, process control of FIG. 1 proceeds to block 120, where the load protocol is implemented. If according to the load protocol technique 120 of FIG. 4, a load is supplied at block 208, the VES supplies a load to the buy/sell utility for a fee (i.e., credit).

Referring back to FIG. 5, since a charge flag will only be set to true if the credit of the SOC difference is not greater than the debit of the SOC difference, the scenario in which a user supplies energy to the buy/sell utility for a cost (i.e., credit) that is less than a cost that would be assessed (i.e., a debit) to receive the same amount of energy is avoided. It is contemplated that the VES may, through communication media, determine energy pricing information from an advanced metering infrastructure (AMI) or from the buy/sell utility.

Figure 6:
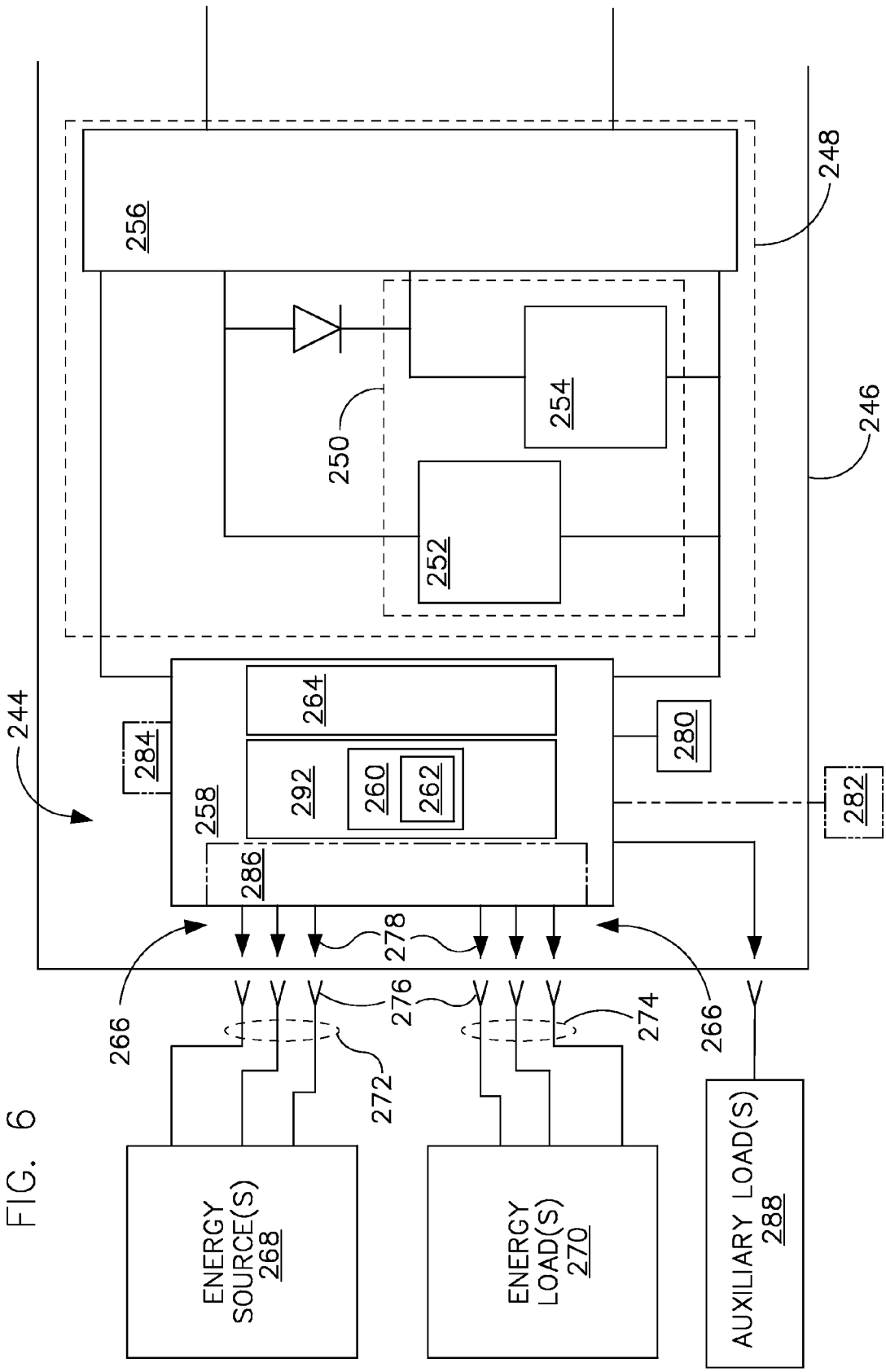
FIG. 6 is a schematic block diagram of an intelligent energy transfer system coupleable to a vehicle according to another embodiment of the invention.

Referring now to FIG. 6, a schematic block diagram of an intelligent energy transfer system 244 electrically coupleable to a vehicle 246 is shown according to an embodiment of the invention. As shown, a vehicle energy system (VES) 248 is coupled to vehicle 246 and includes an energy storage system 250 having a first storage component 252 and a second storage component 254. Embodiments of the invention may be implemented with a variety of electrical storage components. For example, first and/or second storage components 252, 254 may be traction batteries, power batteries, ultra-capacitors, energy batteries, flywheels, or a combination thereof. Further, though two electrical storage components 252, 254 are shown, it is contemplated that embodiments of the invention may implement less than two or more than two storage components. In addition to storage components 252, 254, VES 248 includes a DC-DC conversion component 256. It is also contemplated that embodiments of the invention may be implemented without DC-DC conversion component 256.

According to the present embodiment, intelligent energy transfer system 244 is fixedly attached to or within vehicle 246. Energy transfer system 244 includes an assembly 258 having a processing system 260 with a computer readable storage medium 262 integrated therein or coupled thereto. In addition, intelligent energy transfer system 244 includes a bi-directional convertor 264 that, as will be described in greater detail below, is configured to convert power from vehicle energy system 248 into utility-level electrical power. Coupled to energy transfer system 244 is an electrical coupling system 266 for coupling an electrical energy source (ES) 268 and/or an energy load (EL) 270 to vehicle energy system 248 via one or more external interface systems or cables 272 and 274. It is contemplated that electrical coupling system 266 may be configured to simultaneously allow multiple energy sources 268 and/or multiple energy loads 270 to be coupled to vehicle energy system 248.

In one embodiment, coupling system 266 includes one or more wired interface devices 276 configured to mate with connectors 278 of external cables 272, 274. In another embodiment, coupling system 266 may be a magnetic energy coupling system, and interface devices 276 may be configured to transfer energy from ES 268 to VES 248 or from VES 248 to EL 270 via inductive transfer. In yet another embodiment, coupling system 266 may be a wireless power transfer coupling system, and interface devices 276 may be configured to enable wireless transmission of energy from ES 268 to VES 248 or from VES 248 to EL 270. Combinations of the above or other coupling systems are also contemplated. According to one embodiment of the invention, coupling and de-coupling of VES 248 respectively to or from ES 268 and EL 270 via coupling system 266 is a manual process carried out, for example, by an operator of the vehicle 246.

It is noted that though ES 268 and EL 270 are depicted as being separate from each other, it is contemplated that ES 268 and EL 270 may be the same device or system. For example, an electrical grid may be used to provide a charge to VES 248 during a first time period. In such an instance, the electrical grid serves as ES 268. However, during a second time period, VES 248 may supply energy, possibly for a fee, to the electrical grid. In this instance, the electrical grid also serves as EL 270.

Intelligent energy transfer system 244 may also include, a switch 280 fixedly coupled to vehicle 246. As will be described in greater detail below, it is contemplated that switch 280 may have a first and second position, where the first position may initiate a load protocol. The load protocol, such as load protocol technique 120, may cause VES 248 to transfer energy to a load such as EL 270. In a second position, switch 280 may allow VES 248 to receive a charge from an ES 268 or supply a load to an energy utility grid that serves as EL 270. In an alternate embodiment, it is contemplated that instead of having switch 280 fixedly coupled to vehicle 246, a remote switch 282 may be employed In one embodiment, processing system 260 is programmed to implement an energy transfer technique such as energy transfer technique 100 of FIG. 1. Processing system 260 automatically determines if an external energy system such as ES 268 and/or EL 270 is coupled to VES 248. After the determination, processing system 260 implements a handshaking technique such as handshake technique 104 to ensure that there is no energy transfer between any external energy system (e.g., ES 268 and/or EL 270) and VES 248 if VES 248 is not coupled to a ground and if any existing ground fault current is above a ground current threshold that may be stored, for example, in readable storage medium 262. Processing system 260 may also determine the SOH of VES 248 to determine if the SOH of the VES 248 is above a predetermined threshold. As discussed above with respect to FIG. 2, the SOH of the VES 248 refers to the ability of VES 248 to meet its rated performance during discharge (e.g., supplying a load) or during charge.

After determining the SOH of VES 248, it is determined by, for example, processing system 260 whether the SOH is below a predetermined threshold. If below the threshold, processing system 260 ensures that there is no transfer of energy between external energy systems (e.g. ES 268 and/or EL 270). That is, if the SOH is below the SOH threshold, any existing energy transfer will be deactivated and/or a new transfer of energy will not be initiated. As discussed above with respect to FIG. 2, it is contemplated that the SOH may be determined before the determination of whether any existing ground fault current is below a ground fault threshold. Further, it is also contemplated that the SOH may be determined before a ground connection determination is made.

If the SOH is not below the SOH threshold, an SOC of energy storage system 250 of VES 248 is determined by, for example, processing system 260.

If the SOC of energy storage system 250 is not above the stored SOC threshold, energy will not be transferred from energy storage system 250 to a load such as EL 270. In such an instance, processing system 260 may initiate a charging protocol technique such as technique 112 of FIG. 3, which may initiate energy transfer if it is determined that the external energy system coupled to VES 248 is indeed an energy source such as an ES 268.

If it is determined that the external energy system coupled to VES 248 is an energy source (e.g., ES 268), energy from ES 268 is received by VES 248 and stored in energy storage system 250. It is contemplated that a bi-directional converter such as bi-directional converter 232 conditions incoming energy from ES 268. For example, in one embodiment, bi-directional converter 264 synchronizes incoming DC energy of a DC-type ES with the energy requirements of VES 248 before charging occurs. Similarly, if ES 268 is an AC-type energy source, it is contemplated that bi-directional converter 264 synchronizes incoming AC energy from ES 268 with VES 248 before charging occurs. Accordingly, if charging occurs, the energy transfer is seamless. It is contemplated that after charging is initiated, the charging of energy storage system 250 continues until the SOC threshold is met or exceeded unless the ground connection is lost, unless a ground fault current exceeds a ground fault current threshold, or unless the SOH falls to or below the SOH threshold.

As discussed above with respect to FIGS. 1 and 4, intelligent energy transfer system 244 of FIG. 6 may also cause or allow VES 248 to supply energy to a load (e.g., EL 270). For example, in one embodiment, if processing system 260 determines that vehicle energy storage system 250 is not below the SOC threshold, processing system 260 proceeds to cause the determination of whether switch 280 is in a first or second position. It is contemplated that remote switch 282 may be employed rather than switch 280. In either case, it is contemplated that switch 280 (or remote switch 282) is placed in a first or second position by a user. That is, a user positions switch 280 or remote switch 282 in a first position to initiate the implementation of a load protocol technique such as technique 120 of FIGS. 1 and 4. Accordingly, a load may be supplied to, for example, a home or business. Alternatively, if switch 280 or remote switch 282 is in a second position, processing system 260 determines therefrom that the external energy system (i.e., ES 268 or EL 270) may receive energy from an energy source such as ES 268. It is also contemplated that processing system 260 may determine if the external energy system is a utility that may buy or sell energy (i.e., a buy/sell utility). Further details regarding position two of switch 280 or remote switch 282 will be set forth below.

If processing system 260 determines that switch 280 or remote switch 282 is in a first position, processing system implements a load protocol technique such as load protocol technique 120 of FIGS. 1 and 4. In such an instance, processing system determines whether the external energy system (e.g., ES 268 and EL 270) is an energy load (i.e., EL 270). As discussed above, it is contemplated that a waveform of the energy from the external energy system is detected and analyzed to determine if the energy system is a load (e.g., EL 270). If processing system 260 determines that the external energy system is not an energy load 270 (i.e., it is an ES 268), processing system causes the deactivation or termination of energy transfer, if any, from VES 248 to ES 268. On the other hand, if processing system 260 determines that the external energy system is an EL 270, processing system 260 determines whether EL 270 is an AC or DC energy load. If the load needed by the EL 270 is greater than a VES threshold, transfer of energy to EL 270, if any, is deactivated.

However, if the draw needed by the EL 270 is not above the VES threshold (i.e., the circuitry of VES 248 is capable of safely supplying a load to EL 270), processing system 260 causes the transfer of energy to EL 270 via bi-directional convertor 264. If EL 270 is an AC load, bi-directional convertor 264 transforms DC energy from VES 248 into an AC energy acceptable by EL 270. Similarly, if EL 270 is a DC load, bi-directional convertor 264 transform DC energy from VES 248 into a DC output synchronized with EL 270.

It is contemplated that processing system 260 may determine, or cause the determination of, the voltage threshold of EL 270. Processing system 260 may then determine, or cause the determination of, whether the VES load output is above the voltage threshold of EL 270. If the VES load output is above the voltage threshold of EL 270, processing system 260 ensures that no energy is supplied to EL 270 and deactivates any transfer of energy to EL 270 that may be occurring. In addition, processing system 260 determines the current, voltage, or power requirements of EL 270 and ensures that no energy is supplied to EL 270 if any of the current, voltage, or power requirements exceeds the capabilities of VES 248 and components thereof. As such, the circuitry of EL 270, circuitry of VES 248, and interfaces 296-298 are protected from overload. It is contemplated that a lookup table or the like having voltage, current, and/or power requirements and/or thresholds of a many different energy loads is stored on computer readable storage medium 262 and is accessed by processing system 260 to determined the thresholds and/or requirements for the particular energy load (e.g., EL 270). If the VES output is not above any of the respective requirements or thresholds of EL 270 and also not above the thresholds of the circuitry of VES 248 and interfaces 296-298, energy in the appropriate form is transferred to EL 270.

As discussed above, a user may position switch 280 or remote switch 282 (shown in phantom) in a second position. In such an instance, a charging protocol technique such as charging protocol technique 112 of FIGS. 1 and 3 may be implemented. It is contemplated, however, that processing system 260 of FIG. 6 may implement a utility transfer technique such as technique 124 of FIGS. 1 and 5 if it is determined that switch 280 or remote switch 282 is in a second position. In such an instance, processing system 260 may either pay for the reception of energy from the utility (e.g., ES 268) or sell energy to the utility (e.g., EL 270) based on, in part, credit/debit prices of energy.

It is contemplated that intelligent energy transfer system 244 may have a transceiver 284, such as Zigbee® transceiver (Zigbee® is a registered trademark of Zigbee Alliance Corporation of California) with a smart energy profile, coupled thereto to allow wireless communication with an advanced metering infrastructure (AMI) (not shown) that gathers data such as electricity pricing data from one or more ESs 268 and/or energy/power consumption data from one or more ELs 270. Processing system 260 may then analyze the data according to a utility transfer technique such as technique 124 of FIGS. 1 and 5. According to one embodiment, transceiver 284 gathers electricity pricing information from a public utility, which may serve as both ES 268 and EL 270.

Not only may energy data be communicated wirelessly to and from an AMI, power line communication using, for example, HomePlug® networking (HomePlug® is a registered trademark of HomePlug Powerline Alliance, Incorporated of California) may be used or instead of transceiver 284. Accordingly, in such an instance, data is then transferred to processing system 260 via coupling system 266 from ES 268 and/or EL 270 using a powerline carrier.

As set forth above, processing system 260 deactivates the transfer of electrical energy if, for example, a ground fault current is not below a predetermined threshold. It is contemplated, however, that a ground fault current detector and interrupt (GFCI) device 286 (shown in phantom) could be implemented into intelligent energy transfer system 244, thus allowing an additional avenue to deactivate energy transfer to and from VES 248 than those discussed with respect to FIGS. 2-4. In such an instance, power transfer among ES 268 and energy storage system 250 would be interrupted by GFCI device 286 if GFCI device 286 is tripped by a ground fault current. That is, rather than processing system 260 causing the termination of energy conveyance between ES 268 and energy storage system 250 upon detection of a ground fault current that exceeds a ground fault current threshold, a GFCI device would cause the termination of the energy conveyance.

Also set forth above are various embodiments of conveying electrical energy from ES 268 to energy storage system 250 via intelligent energy transfer system 244. However, it is also contemplated that intelligent energy transfer system 244 may be utilized to transfer electrical energy from ES 268 to an auxiliary load(s) 288. That is, rather than, or in addition to, charging energy storage system 250, ES 268 may be used to supply energy to one or more auxiliary loads 288 electrically coupled to vehicle 246 via intelligent energy transfer system 244. Accordingly, energy incoming to intelligent energy transfer system 244 from ES 268 may be synchronized by bi-directional convertor 264 and directed to auxiliary load 288.

Processing system 260 allows intelligent energy transfer system 244 to serve as a vehicle configurable load panel (i.e., a configurable switching system). In other words, processing system 260 serves to configure intelligent energy transfer system 244 such that energy can be conveyed to and from energy storage system 250 of VES 248, while also allowing the conveyance of energy to one or more auxiliary loads 288.

Figure 7:
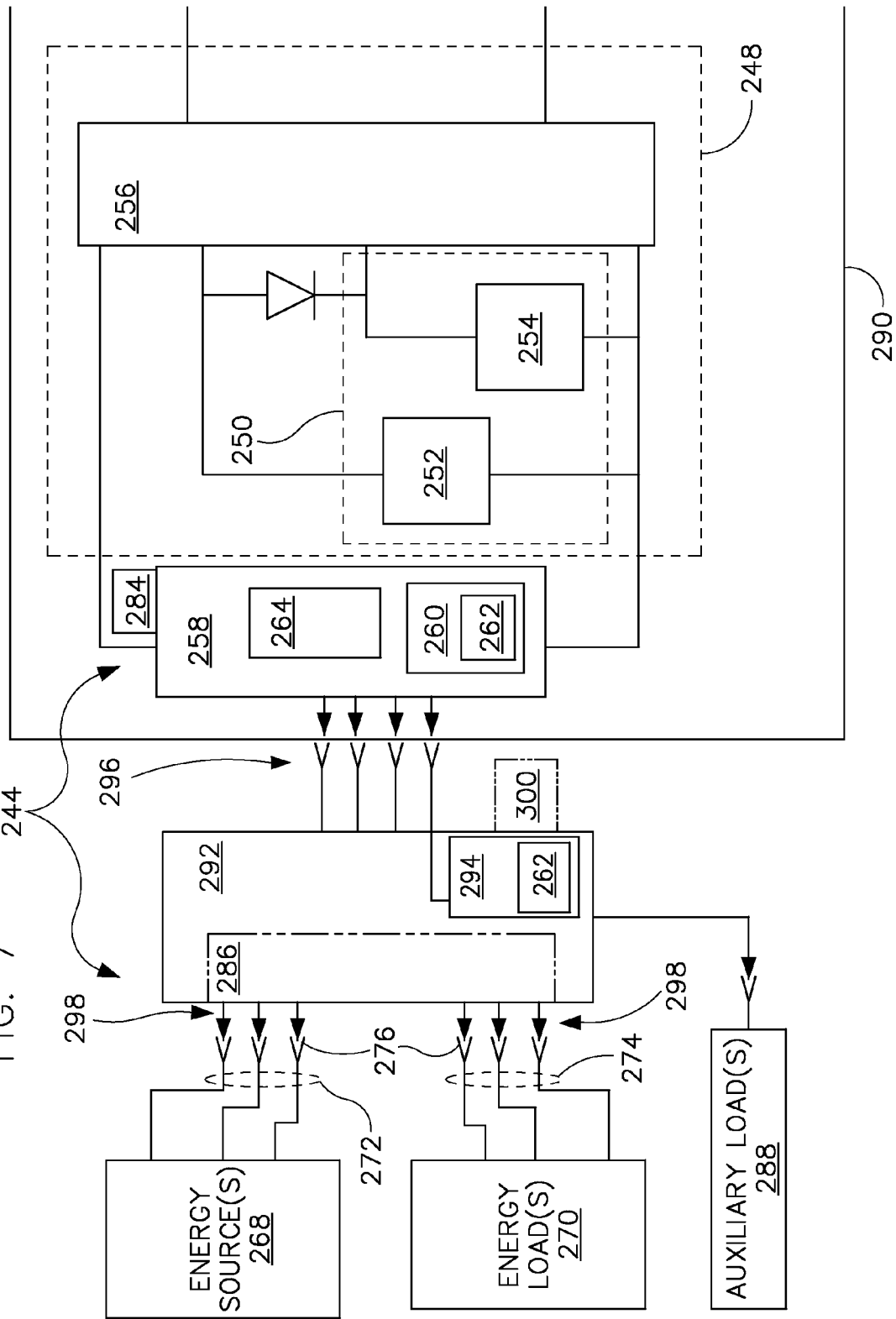
FIG. 7 is a schematic block diagram of an intelligent energy transfer system coupleable to a vehicle according to another embodiment of the invention.

Referring now to FIG. 7, a schematic block diagram of another intelligent energy conveyance system electrically coupleable to a vehicle 290 is shown according to an embodiment of the invention. As shown in FIG. 7, it is contemplated that intelligent energy transfer system 244 also include a remote configurable load panel 292 that may be located remotely from vehicle 290. Further, remote configurable load panel 292 may include a load panel processing system 294. A first coupling system 296 for electrically coupling remote configurable load panel 292 to assembly 258 is also shown. In addition, a second coupling system 298 for electrically coupling remote configurable load panel 292 to one or more ESs 268 and/or ELs 270 is also shown. First and second coupling systems 296, 298 are utilized to transfer electrical energy among ES 268, EL 270, remote configurable load panel 292, and VES 248. Further, like coupling system 266 of FIG. 6, it is contemplated that coupling systems 296, 298 of FIG. 7 may take the form of interface cables, a magnetic inductive energy transfer system, a wireless energy transfer system, a combination of the preceding, or of another form.

In the present embodiment, it is contemplated that communication between remote configurable load panel 292 and assembly 258 may occur via first coupling system 296. That is, it is contemplated that processing system 260 may communicate requests to processing system 294 via first coupling system 296 or via wireless communication between transceiver 284 and a load panel transceiver 300. Likewise, it is contemplated that load panel processing system 294 may communicate requests to processing system 260 also via first coupling system 296 or via load panel transceiver 300 and transceiver 284.

In addition to communicating with processing system 260, it is contemplated that load panel processing system 294 initiates and/or terminates energy conveyance from ES 268 and to EL 270. That is, by implementing handshaking techniques such as safety handshake technique 104 of FIG. 1 and other protocol techniques such as load and charging protocol techniques 120, 112, respectively, supply of electrical energy to and from VES 248 of FIG. 7 can be controlled by remote configurable load panel 292. Accordingly, the safety aspects of techniques 100, 104, 112, 120 are implemented while also protecting the life cycle of energy storage system 250.

A technical contribution for the disclosed method, apparatus, and system is that is provides for a computer implemented method, apparatus, and system of transferring electrical energy to and from a vehicle.

According to one embodiment of the invention, an intelligent energy transfer system includes a configurable switching system electrically coupleable to a vehicle. The vehicle includes one of an electric vehicle and a plug-in hybrid electric vehicle. The configurable switching system is configured to convey a first direct current (DC) energy from a first energy source to an energy storage system of the vehicle, receive a first alternating current (AC) energy conveyed to the vehicle, convey a second DC energy from the vehicle to a first DC powered load, and convey a second AC energy from the vehicle to a first AC powered load. Each of the first energy source, the first AC powered load, and the first DC powered load are located remotely from the vehicle.

According to another embodiment of the invention, a configurable energy conveyance system includes an energy storage system mechanically coupled to a vehicle, a configurable switching system electrically coupleable to the vehicle, and a processing system configured to control the configurable switching system and coupled to the configurable switching system. The vehicle is one of an electric vehicle and a plug-in electric hybrid vehicle. The processing system is programmed to initiate a first transfer of electrical energy from the energy storage system through the configurable switching system to a first load outside the vehicle, initiate a second transfer of electrical energy from the energy storage system through the configurable switching system to a second load outside the vehicle, initiate a transformation of alternating current (AC) electrical energy from an AC source outside the vehicle into direct current (DC) energy, and initiate a third transfer of electrical energy from a DC source outside the vehicle to the energy storage system. The first load includes an AC load and the second load includes a DC load.

According to yet another embodiment of the invention, a method of manufacturing an energy transfer system includes configuring a switching system for a vehicle to provide a first direct current (DC) energy from a first energy source to an energy storage system of the vehicle, programming a conversion device to transform an alternating current (AC) energy passed to the vehicle from a second energy source into a second DC energy based on a voltage of the AC energy, configuring the switching system to provide a DC supply energy to a DC load located remotely from the vehicle, and configuring the switching system to provide an AC supply energy to an AC load located remotely from the vehicle. The vehicle includes one of a plug-in electric vehicle and a plug-in hybrid electric vehicle. The first energy source is located remotely from the vehicle and the second energy source is located remotely from the vehicle.

The invention has been described in terms of the preferred embodiment, and it is recognized that equivalents, alternatives, and modifications, aside from those expressly stated, are possible and within the scope of the appending claims.

What is claimed is:

1. An intelligent energy transfer system comprising:
a configurable switching system electrically coupleable to a vehicle, the vehicle comprising one of an electric vehicle and a plug-in hybrid electric vehicle, wherein the configurable switching system is configured to:
convey a first direct current (DC) energy from a first energy source to an energy storage system of the vehicle;
receive a first alternating current (AC) energy conveyed to the vehicle from a second energy source;
convey a second DC energy from the vehicle to a first DC powered load; and
convey a second AC energy from the vehicle to a first AC powered load, wherein each of the first energy source, the second energy source, the first AC powered load, and the first DC powered load are located remotely from the vehicle.

2. The intelligent energy transfer system of claim 1 wherein the configurable switching system comprises a configurable load panel located remotely from the vehicle, the configurable load panel configured to convey the first DC energy to the energy storage system, the second DC energy to the first DC powered load, a third DC energy to the vehicle, and the second AC energy to the first AC powered load, wherein the first AC energy is transformed into the third DC energy by the configurable switching system.

3. The intelligent energy transfer system of claim 1 wherein the configurable switching system comprises a configurable load panel fixedly attached to the vehicle, the configurable load panel configured to convey the first DC energy to the energy storage system, the second DC energy to the first DC powered load, a third DC energy to the vehicle, and the second AC energy to the first AC powered load, wherein the first AC energy is transformed into the third DC energy by the configurable switching system.

4. The intelligent energy transfer system of claim 3 wherein the configurable load panel is further configured to convey at least one of the first DC energy and the first AC energy to an auxiliary load electrically coupleable to the vehicle, the auxiliary load being located remotely from the vehicle.

5. The intelligent energy transfer system of claim 1 wherein the energy storage system comprises at least one of a battery, an ultracapacitor, and a flywheel, and wherein the configurable switching system is simultaneously coupleable to at least two of the first energy source, the second energy source, the first DC powered load, and the first AC powered load.

6. The intelligent energy transfer system of claim 5 wherein the configurable switching system further comprises a bi-directional AC to DC converter fixedly coupled to the vehicle and configured to transform the first AC energy to a third DC energy and to convey the third DC energy to an energy storage system of the vehicle.

7. The intelligent energy transfer system of claim 6 wherein the bi-directional AC to DC converter is further configured to transform a DC supply energy from the energy storage system to the second AC energy.

8. The intelligent energy transfer system of claim 1 further comprising an interface cable coupled to the configurable switching system and configured to convey at least one of the first DC energy and the first AC energy to the configurable switching system.

9. The intelligent energy transfer system of claim 1 further comprising a magnetic energy coupling device coupled to the configurable switching system and configured to convey at least one of the first DC energy and the first AC energy to the configurable switching system.

10. The intelligent energy transfer system of claim 1 further comprising a wireless power transfer coupling device coupled to the configurable switching system and configured to convey at least one of the first DC energy and the first AC energy to the configurable switching system.

11. The intelligent energy transfer system of claim 1 further comprising a controller electrically coupled to the configurable switching system and configured to control the configurable switching system.

12. The intelligent energy transfer system of claim 11 wherein the controller is programmed to:
determine if a ground fault current between the energy storage system and an earth ground is above a ground fault threshold; and
cause the configurable switching system to withhold at least one of conveyance of the first DC energy, conveyance of the second DC energy, and conveyance of the second AC energy if the ground fault current is above the ground fault threshold.

13. The intelligent energy transfer system of claim 11 wherein the controller is programmed to:
acquire at least two energy values of one of the first DC energy and the first AC energy, the energy values selected from the group consisting of frequency, voltage, and phase; and
at least one of:
initiate the conveyance of the first DC energy to the energy storage system based on the acquired frequency and voltage values; and
transform the first AC energy into a third DC energy based on the acquired frequency, voltage, and phase values.

14. The intelligent energy transfer system of claim 13 wherein the controller is programmed to:
acquire a state-of-charge (SOC) value of a battery of the energy storage system; and
at least one of:
initiate the conveyance of the first DC energy to the energy storage system based on the acquired SOC value; and
initiate the transformation of the first AC energy based on the acquired SOC value.

15. The intelligent energy transfer system of claim 13 wherein the controller is programmed to cause a termination of at least one of the conveyance of the first DC energy and the transformation of the first AC energy when at least one of a state-of-charge threshold, a voltage threshold, and a power threshold is met.

16. The intelligent energy transfer system of claim 13 wherein the controller is programmed to:
determine a debit monetary value of at least one of the conveyance of the first DC energy and the conveyance of the first AC energy;
determine a credit monetary value of the conveyance of at least one of the second DC energy and the second AC energy; and
initiate at least one of the conveyance of the first DC energy and the transformation of the first AC energy based on at least one of the credit monetary value and the debit monetary value.

17. A configurable energy conveyance system comprising:
an energy storage system mechanically coupled to a vehicle, wherein the vehicle is one of an electric vehicle and a plug-in electric hybrid vehicle;
a configurable switching system electrically coupleable to the vehicle; and
a processing system coupled to the configurable switching system and configured to control the configurable switching system, the processing system programmed to:
initiate a first transfer of electrical energy from the energy storage system through the configurable switching system to a first load outside the vehicle, the first load comprising an alternating current (AC) load;
initiate a second transfer of electrical energy from the energy storage system through the configurable switching system to a second load outside the vehicle, the second load comprising a direct current (DC) load;
initiate a transformation of AC electrical energy from an AC source outside the vehicle into DC energy; and
initiate a third transfer of electrical energy from a DC source outside the vehicle to the energy storage system.

18. The configurable energy conveyance system of claim 17 further comprising:
a first transceiver coupled to the vehicle; and
a second transceiver coupled to the configurable switching system and configured to receive energy data relating to at least one of the first load, the second load, the AC source, and the DC source; and
wherein the second transceiver is further configured to transmit the energy data via at least one of a wireless mode and a wired power line mode to the first transceiver.

19. The configurable energy conveyance system of claim 17 wherein the processing system is further programmed to regulate at least one of the transformation of the AC electrical energy, the first transfer of electrical energy, the second transfer of electrical energy, and the third transfer of electrical energy.

20. The configurable energy conveyance system of claim 17 wherein the processing system is programmed to:
determine if at least one of the AC load and the DC load can accept an electrical power within at least one of a voltage threshold, a current threshold, and a power threshold; and
base the initiation of at least one of the first transfer of electrical energy and the second transfer of electrical energy on the determination.

21. The configurable energy conveyance system of claim 17 wherein the processing system is programmed to:
independently compare a plurality of electrical attributes of the energy storage system with a plurality of respective transfer thresholds, the plurality of electrical attributes comprising a state-of-charge (SOC) value of a portion of the energy storage system and a ground fault current; and
base the initiation of the first transfer of electrical energy and the second transfer of electrical energy on the comparison of the plurality of electrical attributes with the plurality of transfer thresholds.

22. The configurable energy conveyance system of claim 21 wherein the processing system is programmed to determine a state-of-health (SOH) value of the portion of the electrical energy storage system, the plurality of electrical attributes further comprises the SOH value, and wherein the determination of the SOH value is based on at least one of:
a battery terminal voltage as a function of current;
an estimate of battery internal resistance;
a battery temperature;
a battery voltage at the SOC value; and
a trend of battery resistance.

23. A method of manufacturing an energy transfer system comprising:
- configuring a switching system for a vehicle to provide a first direct current (DC) energy from a first energy source to an energy storage system of the vehicle, the vehicle comprising one of an electric vehicle and a plug-in hybrid electric vehicle, and wherein the first energy source is located remotely from the vehicle;
- programming a conversion device to transform an alternating current (AC) energy passed to the vehicle from a second energy source into a second DC energy based on a voltage of the AC energy, the second energy source located remotely from the vehicle;
- configuring the switching system to provide a DC supply energy to a DC load located remotely from the vehicle; and
- configuring the switching system to provide an AC supply energy to an AC load located remotely from the vehicle.

24. The method of claim 23 further comprising programming the switching system to:
- determine a state of charge (SOC) of the at least one battery;
- compare the SOC to a SOC threshold; and at least one of
  - initiate a transference of the first DC energy based on the comparison; and
  - initiate the transformation of the AC energy based on the comparison.

25. The method of claim 24 further comprising programming the switching system to:
- synchronize the first DC energy with the energy storage system of the vehicle, the energy storage system comprising at least one of a battery, an ultracapacitor, and a flywheel; and
- synchronize the AC energy with the energy storage system.

26. The method of claim 23 further comprising:
- programming the switching system to determine at least two of an input phase, an input frequency, and an input voltage for at least one of the DC load and the AC load; and at least one of:
  - initiate a transference of the DC supply energy to the DC load based on the determined input frequency and input voltage of the DC load; and
  - initiate a transference of the AC supply energy to the AC load based on the determined input phase, input frequency, and input voltage of the AC load.

* * * * *